June 26, 1962

L. E. ELPHEE 3,040,376

METHOD AND APPARATUS FOR HANDLING
AND TRIMMING PLASTIC ARTICLES

Filed Jan. 21, 1960

INVENTOR.
LEON E. ELPHEE
BY

ATTORNEYS

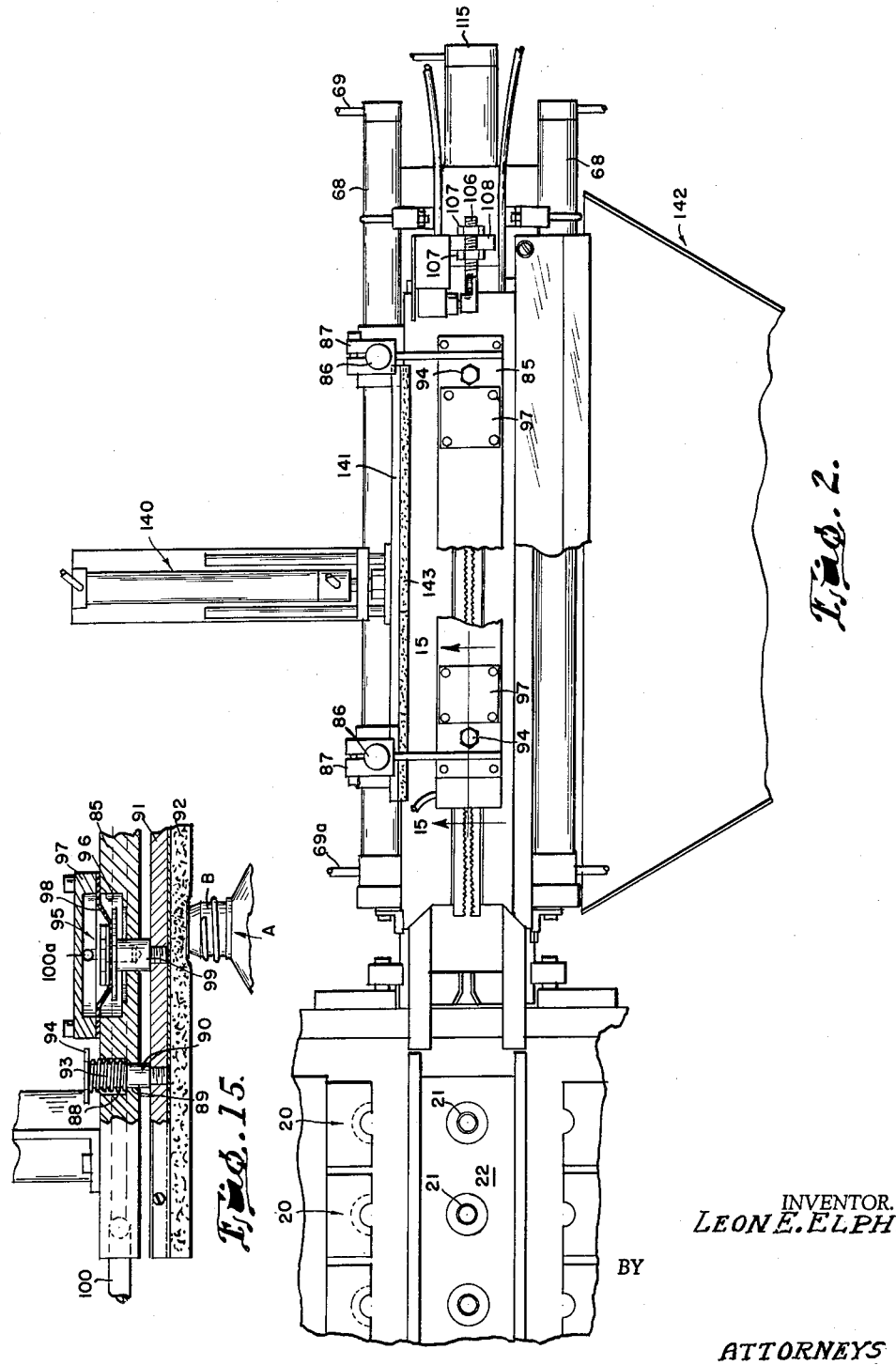

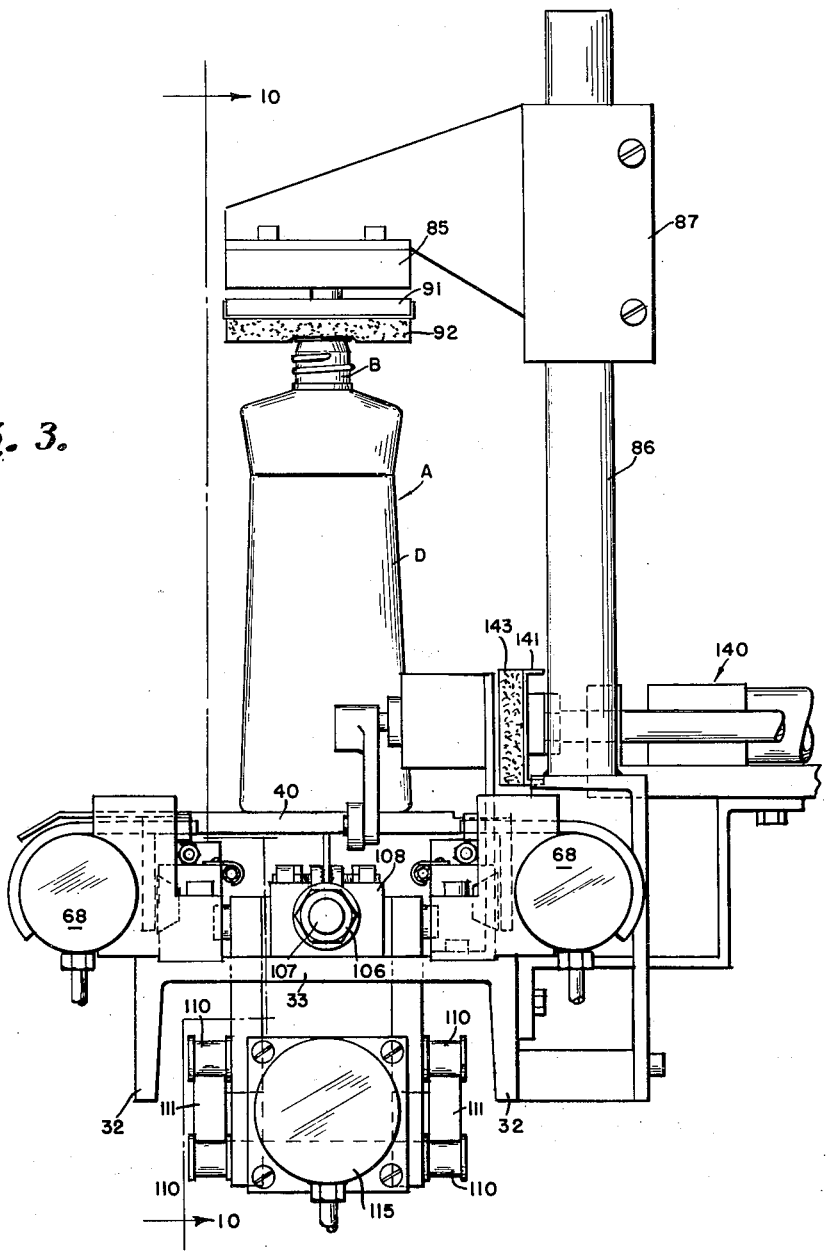

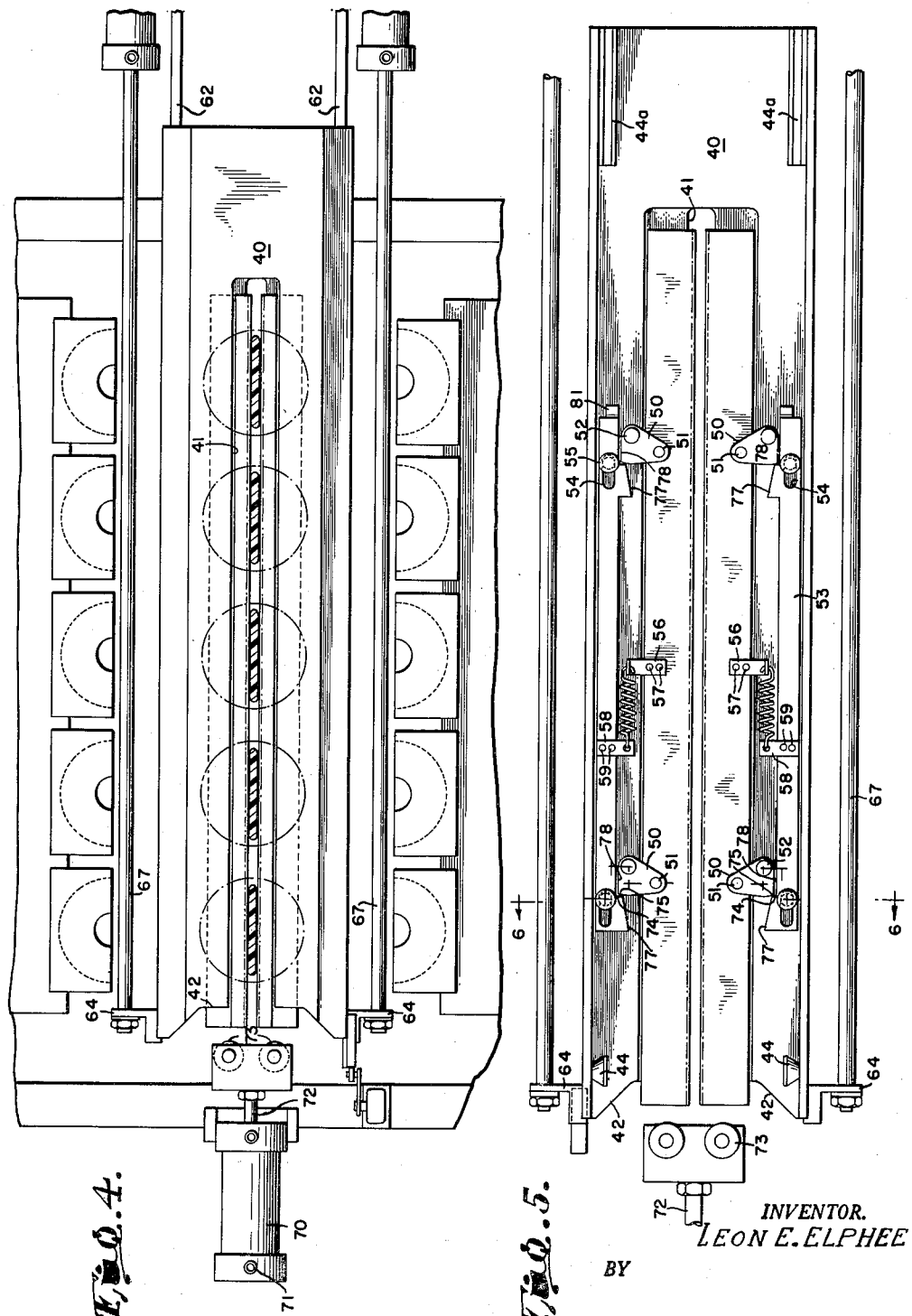

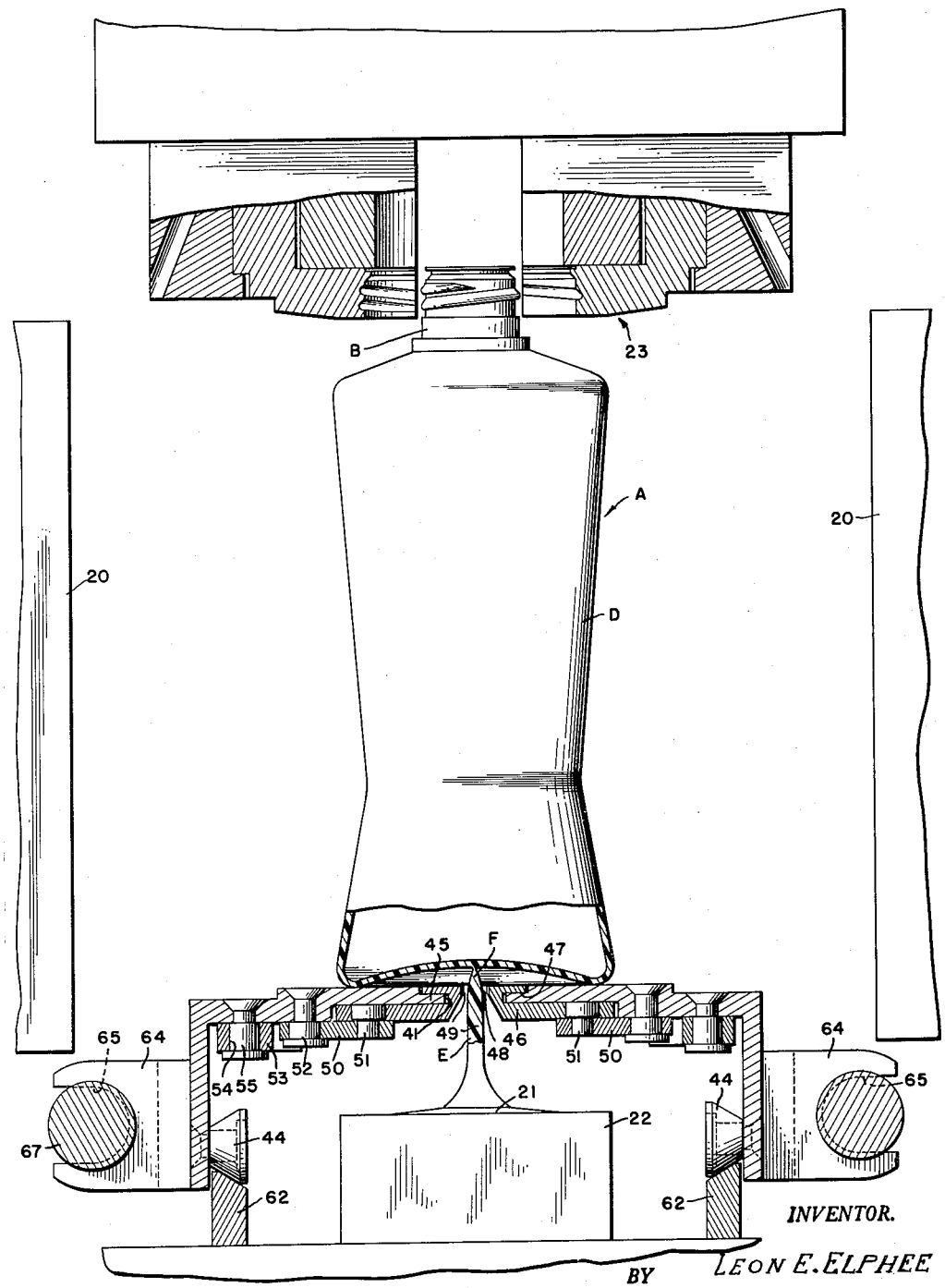

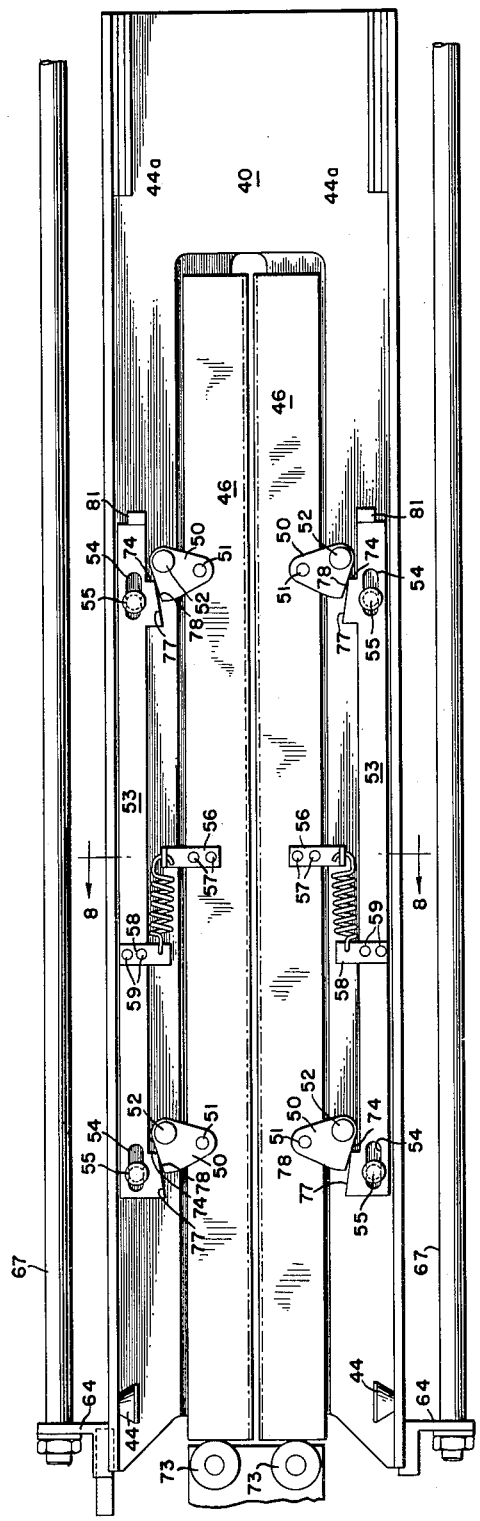

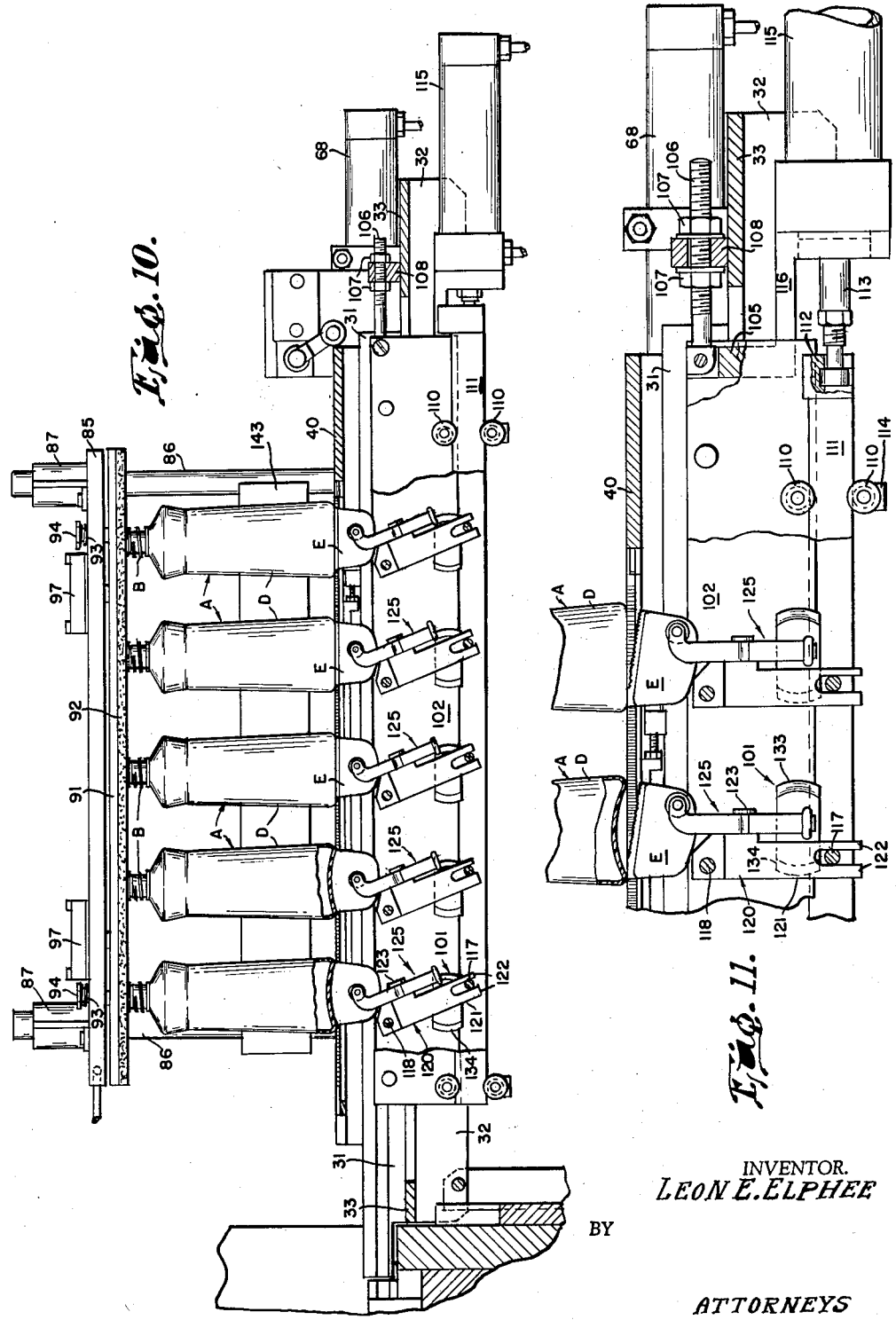

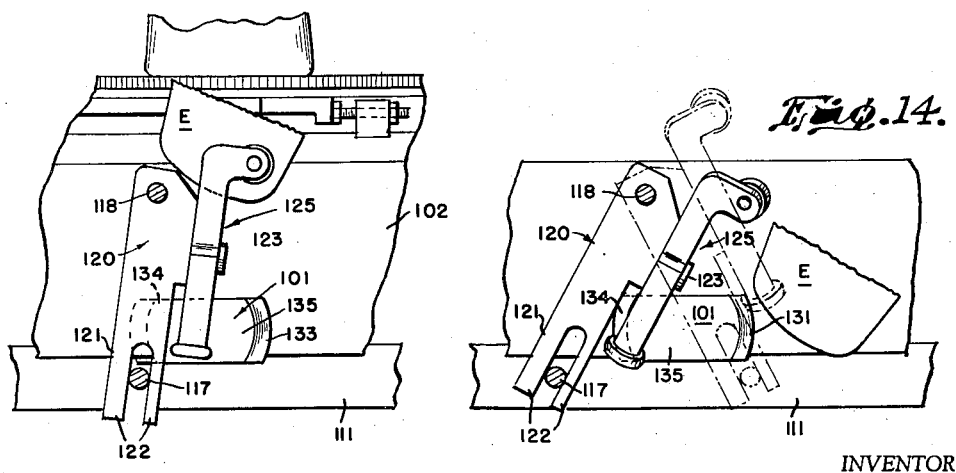

United States Patent Office 3,040,376
Patented June 26, 1962

1

3,040,376
METHOD AND APPARATUS FOR HANDLING AND TRIMMING PLASTIC ARTICLES
Leon E. Elphee, Toledo, Ohio, assignor to Owens-Illinois Glass Company, Toledo, Ohio, a corporation of Ohio
Filed Jan. 21, 1960, Ser. No. 70,091
(Filed under Rule 47(b) and 35 U.S.C. 118)
17 Claims. (Cl. 18—2)

The present invention relates to a take-out device and method and more particularly to a device and method for removing a still-hot plastic article having an integral waste portion from a plastic forming machine and for separating the waste portion from the article after such removal.

In my earlier filed application in which I am a coinventor with Richard C. Allen, Serial No. 797,276, filed March 4, 1959, assigned to the assignee of the present invention, there is disclosed a plastic forming machine wherein a plurality of plastic articles are simultaneously formed by combined injection molding, extrusion, and blowing process. In my sole earlier filed application, Serial No. 803,026, filed March 30, 1959, now Patent No. 2,992,454, and also assigned to the assignee of the present invention, there is disclosed and claimed a take-out device which utilizes resilient fluid-pressure actuated engaging means for contacting the formed articles and for removing the articles to a remote location.

The present invention is adapted for use with a forming machine of the type disclosed in the above-identified prior application, Serial No. 797,276, and constitutes a specific improvement on the take-out of my above-identified prior application, Serial No. 803,026.

The specific improvements of the present invention arise from the fact that the plastic forming machine disclosed in the above-identified joint application blow molds the article body from an extruded tube upon which separable blow molds are closed exteriorly of an extrusion orifice. Such a process inherently leaves a "tail" or waste portion intermediate the point at which the tube is pinched by the blow molds and the orifice through which the tubular extension was extruded prior to mold closure. My earlier take-out device removed the articles with the "tail" intact, thereby requiring a separate tail-severing operation. Further, my earlier take-out engaged the body portion of the finished article, and even though the article was handled as gently as possible with resilient gripping pads, some deformation and/or surface distortion or marring of the still-hot article may occur.

The take-out device herein disclosed does not engage the articles, per se, for retraction from the forming machine. Rather, the "tail" or waste portion formed during the article-forming cycle is engaged by the take-out, and the article is supported without gripping any portion of the article. After retraction of the articles from the forming machine, the article waste portions, preferably while the articles are still supported by the take-out device, are aligned with removing means which are actuated to tear the tails or waste portions from the articles. Finally, the articles are ejected from the take-out mechanism for subsequent printing, filling, or other process operations.

By engaging the waste portions of the articles only, it is possible for metallic gripping means of high thermalconductivity to be utilized, thereby more positively engaging the article-waste portions during removal while at the same time extracting heat from the tail so as to render the subsequent tear-off easier.

Also the engagement of the tail pieces of the finished articles during extraction of the articles from the forming machine eliminates the necessity of separately shearing the waste portions of the articles from the extrusion orifices. The material within the orifices is still fluid, while the previously extruded material exterior of the orifices is solid. The positive gripping of the articles by the tail pieces makes possible the rupture of the tail pieces from material filling the orifices by shearing the fluid material at or slightly below the orifice opening.

It is, therefore, an important object of the present invention to provide an improved take-out mechanism for removing an article from a plastic forming machine.

Another important object of this invention is the provision of an article take-out having gripping means engageable with a waste portion formed integrally with and united to a finished article, thereby preventing distortion of and possible surface damage to the finished article during removal.

It is a further object of this invention to provide a combined take-out and waste portion removal apparatus for a plastic forming machine wherein a formed article is gripped by waste portion while in its forming position, removed from its forming position while so gripped, the waste portion aligned with removal means, and the waste portion removed.

Yet another object of this invention is the provision of a combined take-out and waste portion removal apparatus for removing from a forming machine a formed article having an integral waste portion and including gripping means engageable only with the waste portion, retracting means for removing the article while so gripped from the forming machine, and waste portion removal means engageable with the waste portion and movable relative to the article to tear the waste portion therefrom.

It is still another important object of this invention to provide an improved method of removing an article from a plastic forming machine and removing a waste portion from the article and including the steps of engaging the waste portion, bodily shifting the article and the integral waste portion to a remote station, gripping the waste portion and moving the waste portion relative to the article while supporting the article to tear the waste portion therefrom.

An additional important object resides in a take-out device and method of removing an article from a molding apparatus in which the article is joined to material filling a forming orifice by an integral waste portion, wherein the article waste portion only is engaged and the article and the integral waste portion are moved relatively to the orifice to sever the waste portion from the material filling the orifice.

Other and further objects and advantages of the invention will appear from the following detailed description taken in conjunction with the annexed drawings, in which:

On the drawings:

FIGURE 2 is a plan view of a take-out of the present invention, similar to FIGURE 1;

FIGURE 3 is an end elevational view of the take-out of FIGURES 1 and 2;

FIGURE 4 is a fragmentary sectional view showing the take-out in its article-removing position immediately prior to engagement with the articles;

FIGURE 5 is a view similar to FIGURE 4, but inverted, to show the underside of the take-out mechanism when in its position of FIGURE 4;

FIGURE 6 is an enlarged sectional view taken along the plane 6—6 of FIGURE 5;

FIGURE 7 is a view similar to FIGURE 5, but enlarged, and showing the take-out in its article-engaging position;

FIGURE 8 is an enlarged fragmentary sectional view taken along the plane 8—8 of FIGURE 7;

FIGURE 9 is an enlarged fragmentary sectional view showing the take-out in a retracted position;

FIGURE 10 is a sectional view on a reduced scale taken along the planes 10—10 of FIGURE 3;

FIGURE 11 is an enlarged fragmentary sectional view similar to FIGURE 10 illustrating an adjusted position of the apparatus;

FIGURE 12 is a greatly enlarged fragmentary sectional view taken along the plane 11—11 of FIGURE 1;

FIGURE 13 is an enlarged fragmentary sectional view similar to FIGURE 11;

FIGURE 14 is a view similar to FIGURE 13; and

FIGURE 15 is an enlarged fragmentary sectional view taken along plane 15—15 of FIGURE 2.

As shown on the drawings:

The Article Forming Apparatus

Figure 1:
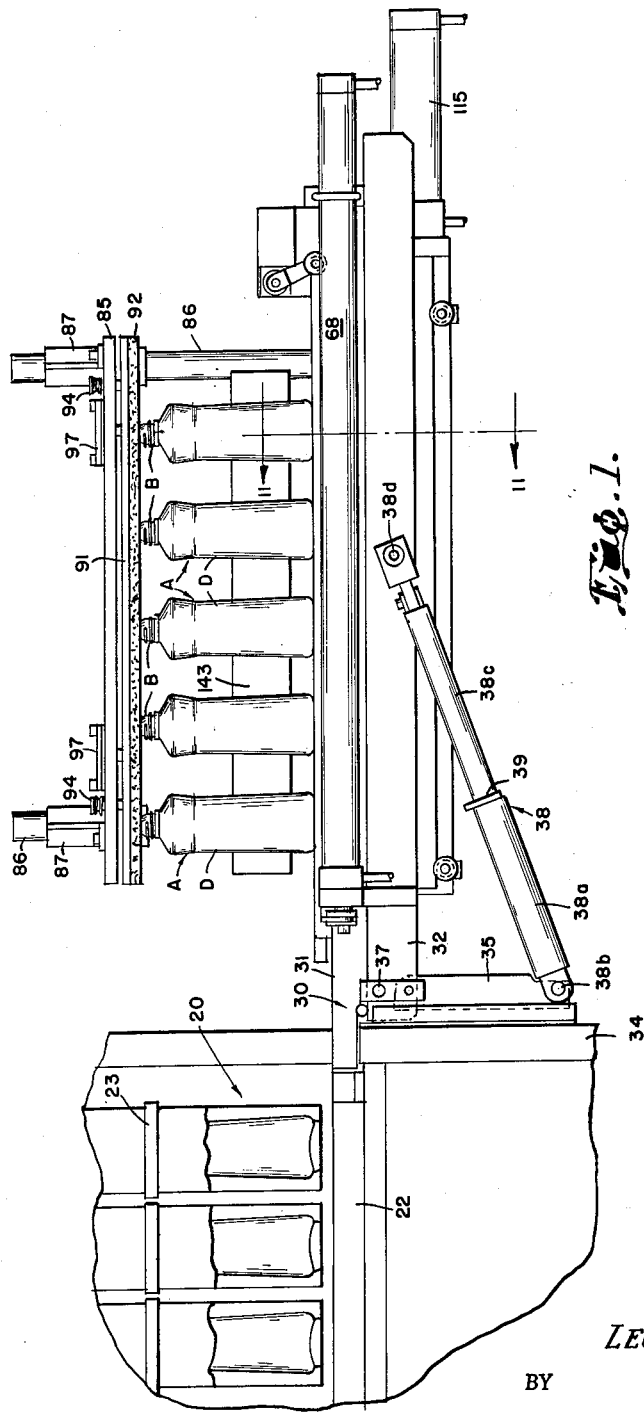
FIGURE 1 is a side elevational view of a take-out mechanism of the present invention for utilization with a forming machine shown in elevation and with parts broken away.

As hereinbefore explained, the take-out apparatus and method of the present invention is particularly adapted for utilization with the apparatus and method of forming plastic articles disclosed in my above-identified copending application filed jointly with Richard C. Allen, Serial No. 797,276.

In this earlier filed application, hollow plastic articles such as containers or the like are formed by the blowing within separable blow mold sections 20 (FIGURE 1, 2, and 6) of thermoplastic extrusions issued through annular orifices 21, a plurality of such aligned orifices 21 being provided by a horizontal orifice plate 22. The extrusions through the orifices 21 are tubular and are joined integrally to injection molded portions confined in vertically movable neck or finish molds 23. The extrusion of the tubes through the orifices 21 occurs during upward movement of the filled injection molds 23, the extruded tubes being subsequently enclosed in the blow mold sections 20 and blown thereagainst to their final configurations.

The resultant finished articles may satisfactorily comprise containers A (FIGURES 1, 3, and 6) having injection molded and finished necks B formed within the injection molds 23, blown body portions D of a contour defined by the molds 20, and lower "tails" or waste portions E defined by the material intermediate the lowermost extremities of the blow molds 20 and the orifices 21. These portions E actually result from the pinching and closing of the tube by the molds 20 in spaced relation above the orifice plate 22. In FIGURE 6 the positioning of the finished article A having its injections molded neck or finish portion B released from the neck mold and its lower extremity still joined through the waste portion E to material filling the orifice is illustrated. Inasmuch as the method of and apparatus for forming the article A forms no part of the present invention, reference is made to the above-identified copending joint application, Serial No. 797,276, for a full disclosure thereof.

Suffice it to say that there is formed a plurality of articles A aligned longitudinally of the orifice block 22 and having lower waste portions E also aligned as best illustrated in FIGURE 4 of the drawings.

The waste portions E are of a thickness substantially greater than the wall thickness of the article body D, since the portions E are of double thickness and are not expanded by blowing. However, the molds 20 close on that part F of the portion E immediately adjacent the bottom of the article body D, and accordingly this portion F is of reduced thickness. Additionally, the portion F is chilled by its contact with the pinching edges of the molds and can be ruptured or torn cleanly without "stringing" or pulling out the chilled material thereof. Thus a substantial difference in heat content results between the chilled, thin, relatively cool joining portion F and the nonchilled, thick, relatively hot tail E.

The entire article A is still-hot after opening of the molds 20 and any pressure contact with the body portion D thereof may well result in surface deformation of the article. Since the tail E is waste anyway, any deformation thereof is of no consequence.

Article Removal Apparatus

As best shown in FIGURES 1, 11, and 12, the take-out generally comprises a rigid frame 30 which comprises generally an elongated piece 31 of rectangular bar stock lying on either side of the medial longitudinal plane of the frame, the medial longitudinal plane of the frame being substantially aligned with the series of aligned orifices 21. The main frame bars 31 are reinforced by longitudinal angle irons 32, respectively, secured to the bars 31 to depend therebeneath.

To interconnect and rigidify the main frame bars 31 and angles 32, a traverse frame plate 33 is provided at each end thereof, the bars 31, angles 32, and plates 33 forming a rigid box structure. A vertical frame element 34 of the forming machine is provided with a pair of vertically extending support elements 35 on which are mounted bifurcated rigid attachment brackets 36. These brackets 36 are attached to the reinforcing angle irons 32 by pivot bolts 37 (FIGURES 1 and 12).

A triangulated support is provided by a strut 38 comprising a tubular portion 38a pivotally secured, as at 38b, to the support element 35 and a smaller tubular member 38c pivotally connected to the angle iron 32, as at 38d. The element 38c is telescopic within the larger tubular element 38a and is secured in position by suitable means, as by a fastening clip 39.

The article removal apparatus comprises a take-out plate 40 (FIGURES 4 to 6 and 12), the plate actually being the medial web of a channel iron having an elongated, longitudinally extending recess 41 formed therein to open onto the leading end 42 thereof. The plate 40 is provided with down-turned legs 43 for rigidity, such legs each carrying tapered guiding rollers 44 adjacent the forward extremity of the plate and tapered guiding surfaces 44a adjacent the rear extremities of the plate.

The slot 41 is defined by a plate portion 45 of reduced thickness and slideably disposed upon each reduced thickness portion 45 is a gripper member 46, each such gripper member 46 having a groove 47 therein receiving the reduced portion 45 of the plate 40. The two gripper members cooperate to define therebetween a slot 48, either side of the slot being defined by serrated longitudinal edges 49 on the gripper members 46.

Each gripper member 46 is pivotally secured to a pair of longitudinally spaced cam elements 50 mounted on pins 51 trapped beneath the undersurface of the plate 40 and the upper surface of the cams 50. The cams 50 are also secured to the plate 40 laterally exteriorly of the gripper elements 46, as by pivot pins 52.

Carried by the plate adjacent each of the cams 50 is an elongated actuating arm 53, these arms being provided with elongated slots 54 receiving slide pins 55 carried by the arm 40 and depending therebeneath for entry into the slot. Secured to each of the gripping members 46, as by rivets 57, is a spring clip 56. A similar spring clip 58 is secured to the actuating slide or arm 53 by suitable means, as by rivets 59. Springs 60 secured under tension to the clips 56 and 58 are utilized to lock the gripping members 46 in their two relatively moved positions illustrated, respectively, in FIGURES 5 and 7 of the drawings.

As best illustrated in FIGURE 12 of the drawings, the plate 40 is guided for longitudinal displacement relative to the main fixed frame 30 by means of the rollers 44 and slides 44a carried by the plate legs 43. It will be noted that the rollers 44 and slides 44a are enterable into slots 61 formed in the frame bars 31, and the rollers 44 and the guide slots 61 have substantially matching frustoconical configurations. When the plate 40 is in its retracted position illustrated in FIGURES 1 and 2, both the forward rollers 44 and the rear slides 44a are located in the slots 61. Transversely spaced longitudinally extending guide bars 62 are positioned in transversely spaced relation on either side of the aligned orifices 21 for guiding contact with the forward set of rollers 44 and the rear slides 44a as the plate is extended over the orifices 21 as will be hereinafter described in greater detail.

The plate legs 43 carry adjacent their forward extremities laterally extending attachment brackets 64, each having central arcuate recesses 65 adapted to telescope into attachment grooves at the forward extremities of actuating rods 67 of fluid pressure actuated cylinders 68. These actuating rods 67 are extensible beyond the cylinders 68 by a suitable fluid medium, such as air, introduced into the cylinders from a suitable source, as through pneumatic pressure line 69. Retraction of the rods is accomplished by means of the cylinder 68 upon the introduction of pneumatic pressure through retraction lines 69a.

From the foregoing description it will be readily appreciated that relative telescopic extended movement of the plate 40 from its position of FIGURE 2 to its position of FIGURE 4 will be accomplished upon actuation of the cylinders 68 to extend the rods 67. Such movement terminates when the position of FIGURE 4 is attained, at which position the aligned waste portions E of the articles A are positioned within the slot 48 intermediate the gripping elements 46. The gripping elements 46 are at this time in their positions of FIGURE 5 with the serrated edges 49 thereof separated, so as to accommodate telescopic movement of the edges relative to the articles A to the position of FIGURE 4.

Upon the attainment of the position of FIGURE 4, a gripper-actuating cylinder 70 (FIGURES 4, 5, and 6) is actuated, as by the introduction of air or other actuating pressure into the cylinder 70 through supply line 71, to advance the cylinder actuating rod 72 to its position of FIGURE 7 at which projections 73 carried by the rod 72 contact the remote forward ends of the gripping members 46 to force these members rearwardly relative to the plate 40 to their positions of FIGURE 6.

In order that such movement can be accomplished, relative movement between the actuating plate 53 and the cam 50 is necessary. It will be noted that the plates 53 are each provided with locking recesses 74 defined by edges lying normal to the path of movement of the plate 40. Relatively sharp cam projections 75 are seated in these recesses 74 when the cams and plates are in their relative positions of FIGURE 5. Rearward actuations of the gripping plates 46 carry the cam pins 51 to the right (as viewed in FIGURES 5 and 7), such movement necessarily taking place on an arc about the axis of the cam pins 52 interconnecting the cams and the plate 40. The fixed plates 40, the movable clamping plates 46, and the two cams 50 form a quadratic linkage, and all positions of the plates 46 are mutually parallel. Thus the serrated edges 49 are always parallel.

Additionally, such movement of the plates 40 will increase the tension of springs 60 to urge the plates 46 to the right due to displacement of the spring retainers 56 to the right. The displacement of the cams arcuately in a clockwise direction forces the cam projections 75 against the edges of the locking recesses 74. The slots 54 of the arms 53 accommodates such movement of the locking arms 53 to the left as required for unlatching the cams, the leftward movement taking place against the tension of the spring 60. Thus, the cams 50 free the clamping member 46 for movement to the right, and simultaneously the tension of the springs 60 pulls the locking plates 53 to the right, such movement being accommodated by movement of the rivets 55 in their slots 54. At this time the inclined cam surfaces 77 of the locking plates contact the adjacent elongated camming surfaces 78 of the cams, thereby locking the cams in their positions of FIGURE 6 by virtue of the tension of the springs 60.

As a result of such movement, the gripping members 46 are moved toward one another to contact their serrated edges 49 with the opposing sides of the waste portions E of the articles A under a clamping force determined by the tension of the springs 60. Such contact is shown in FIGURE 8. By virtue of the serrated gripping edges 49, the plate 40 has been secured to the waste portions E of the articles A.

The vertical location of the upper surface of the plate 40 is such that the bottom surfaces of the articles A rest on the upper surface of the plate 40 on either side of the slot 41 therein. Prior to or at least by the time of engagement of the clamping member 46 with the waste portion E of the articles A, the article finished portion B is released from the neck molds so that the only force retaining the article A in its illustrated position of FIGURE 4 is the connection of the article A through its waste portion E with material filling the orifice 21.

Next, air or similar motive fluid is introduced through the line 69a to retract the actuating rods 67 of the cylinders 68 and the plate 40. The articles A resting on the plate 40 and gripped at their waste portions E by the serrated edges 49 of the gripping member 46 are moved from their position of FIGURE 4 to the position of FIGURE 1. During this retraction of the plate 40 and the articles A, the actuating force of the cylinders 68 is greater than the cohesion between the waste portions E and the material filling the orifices 51, this material being fluid and easily rupturable. As a consequence, the tails E are easily and cleanly severed from the orifices and the articles A are retracted with the tail portions E integral therewith.

As best illustrated in FIGURES 10 through 13, the frame bar members 31 carry adjustable stops 80 which are abutable with stop projections 81 located at the rear ends of the arms 53 when the plate 40 assumes its position of FIGURE 9. The projections 81 on the arms 53 strike the abutments 80 prior to the end of retractive movement of the plate 40, the distance travelled by the plate 40 after such abutment being substantially the length of but slightly less than the slots 54. The abutments halt movement of the arms 53 while movement of the plate 40 continues. In this manner, the arms 53 are moved relatively to the left, i.e., from their positions of FIGURE 7 to their positions of FIGURE 5, so that the rivets 55 are moved to the right within the slots 54, relatively. Thus the notches 74 in the arms 53 are once again positioned as illustrated in FIGURE 5 relative to the cam nose or corner 75. Since the gripping members 46 are moving to the right, while the arm 53 is held stationary, tension in the springs 60 again will be increased, and this increased tension will resist further movement to the right of the plates 46. During final movement of the plate 40, or even after movement of the plate 40 has ceased, the springs 60 will be effective to urge the free floating gripper plates 46 relatively to the left, moving the cam pins 51 in a clockwise direction to place the nose 74 of each cam in the corresponding notch 74. Once the cams 50 and the arms 53 have been so positioned, further tension in the springs will merely serve to pull the cam noses 75 and the notches 74 into tighter engagement.

Thus the plates 46 are positioned in their spaced-apart relation of FIGURE 5 ready for the next successive actuation of the plate 40 to thereby freely receive the waste portions E of successively formed articles A.

Of course, transverse outward relative movement of the clamping plates releases the waste portion E of the articles A and the various portions of the take-out are now positioned as illustrated in FIGURE 12 of the drawings.

*Waste Portion Removal Apparatus*

Inasmuch as the articles A are now merely seated on the upper surface of the plate 40, the tails E having been released by the gripping means, it is necessary to fix the articles A securely to the surface 40. This is accomplished by means of mechanism best illustrated in FIGURES 2, 10, and 15 of the drawings and including a fixed support plate 85 spaced from the plate 40 and overlying the plate 40 when the plate 40 and the articles A supported thereon are fully retracted. This plate 85 is carried by a pair of upwardly extending supporting posts 86 and is secured thereto by any suitable means, such as by clamping collars 87.

As best illustrated in FIGURE 15, the support plate 85 is provided with a pair of vertical recesses 88 each communicating with a lower reduced aperture 89 through which is slideable a supporting pin 90 carrying a lower hold-down plate 91 having its lower surface covered with a resiliently distortable pad 92 formed of suitable material, such as sponge rubber, cellular polyurethane or the like. The plate 91 is urged to an upper position abutting the under surface of the support plate 85 by springs 93 bottomed in the recesses 88 and acting upon an enlarged cap 94 for the pin 90. To actuate the hold-down plate 91 to its lower position, as illustrated in FIGURES 10 and 15, a generally circular diaphragm chamber 95 is provided by a recess 96 formed in the upper surface of the plate 89 and an upper recessed cap 97 overlying the recess 96. Clamped intermediate the cap 97 and the plate 85 is an air-impermeable diaphragm 98, medially secured to a sliding post 99, the lower end of which is fixed to the hold-down plate 91. Fluid under pressure, preferably air from a source of pneumatic pressure, is furnished to the upper portion of the chamber 95 through a supply line 100 and a supply opening 100a to urge the diaphragm 98 downwardly, thereby exerting a downward force through the hold-down plate 91 and the pad 92 on the upper ends of the articles A to maintain the articles in firmly seated position on the plate 40.

The articles A now being fixed in position on the plate 40, it is possible to remove the tail portions E by means of a novel tail-engaging and tearing structure best illustrated in FIGURES 10 through 14, inclusive. Briefly, such structure includes a plurality of fixed cams 101 mounted on vertically depending, parallel, longitudinally extending subframe plates 102. The subframe plates are provided with laterally extending cylindrical projections 103 entered in longitudinal slots 104 formed in the confronting or inner vertical surfaces of the bar members 31, the plates being joined front and rear by transverse plates 105 to form a hollow, rectangular, supporting structure.

This hollow, rectangular, supporting structure is longitudinally adjustable by means of a bolt 106 (FIGURE 11) having positioning nuts 107 on either side of a vertical boss 108 formed on the main frame transverse rear plate 33, heretofore described. The side plates 102 each carry a pair of vertically spaced rollers 110 adjacent both their front and rear extremities, these rollers journalling therebetween for longitudinal displacement a pair of actuating bars 111. The bars 111 are joined at the rear by transverse bar 112 secured to the actuating rod 113 of a power actuated cylinder 115 secured through a bracket 116 to the transverse member 105 of the subframe comprising the plates 102. Thus it will be seen that adjustment of the subframe by threaded adjustment of the nuts 107 in the screw 106 will longitudinally adjust simultaneously the subframe side plates 102 and the actuating bars 111, together with the actuating rod 113 and the cylinder 115.

The actuating bars 111 are joined at spaced points along their length by transverse cylindrical rods 117 for a purpose to be hereinafter more fully described. Since the bars 111 are movable longitudinally relative to the subframe, the sideplates 102 are provided with projections 114 carrying the rollers.

Generally superimposed over and spaced from the actuating bar pins 117 are a corresponding number of pivot pins 118 carried by and extending between the side plates 102. Disposed upon each such pivot pin 118 is a pivot arm 120, the arm depending from the pin and having a bifurcated lower end 212, the furcations 122 of which contactably receive the actuating pin 117 therebetween. Obviously, actuation of the cylinder 115 will reciprocate the bars 111 and the pins 117 carried thereby to pivotally actuate the pivot arms 120 about the pivot pins 118. It will be appreciated that the plurality of pivot arms 120 will be simultaneously actuated upon actuation of the cylinder 115.

Each of the pivot arms 120 has secured thereto medially of the height thereof a pivot screw or the like 123 threaded or otherwise received by the pivot arm 120 to pivotally mount a pair of medially pivoted tail-removing arms 125. These tail-removing arms 125 each have upper portions 126 laterally offset from the pivot screw 123 to one side thereof and lower actuating portions 127 offset to the opposite side of the pivot screw 123. Thus the arms 125 are capable of scissors-like action, actuation of the lower legs 127 toward one another moving the upper ends 126 toward one another.

The lower legs 127 are urged apart by compression springs 128 interposed therebetween and the upper extremities of the upper arms 126 carry gripping pads 130 having confronting serrated faces. The lower extremities of the legs 127 carry cam rollers 132 contactable with the cams 101 heretofore described. These cams 101 have fragmentary arcuate longitudinal extremities 133 and 134 joined by a planar central portion or surface 135. The center portion 135 lies in a plane parallel to but spaced inwardly from the subframe side plates 102, while the partial arcuate surfaces 133 and 134 are inclined outwardly toward the plane of the adjacent side plate 102, respectively.

Thus as illustrated by a comparison of FIGURES 10, 11, 13, and 14, actuation of the cylinder 115 to extend the piston rod 113 thereof will displace the actuating pins 117 to the left, thereby pivoting the pivot arms 120 clockwise so as to effect movement of the cam followers 132 over the cam surface 133 onto the planar portion 135 of the cam and then over the arcuate cam portion 134. Thus the serrated gripping surfaces 131 carried by the upper leg portions 126 will be urged toward one another and will travel in an arcuate clockwise direction.

The purpose of this specific actuation of the gripping surfaces will be readily appreciated from a comparison of FIGURES 10, 11, 13, and 14, from which it will be seen that retraction of the supporting plate 40 and laterally outward movement of the gripping plates 46 will position the articles A in substantial vertical alignment with the actuating pins 117 and the pivot pins 118 when the cylinder 115 is in its retracted position. At this time the serrated engaging surfaces 131 will be spaced laterally with respect to one another to lie on either side of the waste portion E of the article A.

After actuation of the resilient hold-down pad 92 into engagement with the articles A, the cylinder 115 is actuated to displace the actuating arms 111 to the left as viewed in FIGURES 10, 11, 13, and 14, thus pivoting the pivot arms 120 about the pins 118 and traversing the cam followers 132 over the surfaces of the cams 101. Initially, such arcuate movement will engage the serrated surfaces 131 with the tails E, but the extent of arcuate movement necessary to bring the surfaces into engagement with the tails is such that the tails are engaged adjacent their right hand extremities. Subsequent displacement of the piston rod 113 will first snugly engage the gripping surfaces 131 with the tails E until cam surface portions 135 are attained. Subsequent arcuate movement across the cam surface 135 will pull the tail downwardly in arcuate path and at an angle such that a natural tearing action results with the article A being adequately supported on the upper surface of the plate 40.

This natural tearing action is aided by the fact that the plastic portion F at the line of juncture between the tail and the article A is extremely thin and has been chilled by the mold so as to tear easily. To prevent tearing of the tail proper, it has been found advantageous to provide elongated air conduits 140 carried by the support bars 31 and having a plurality of spaced nozzles to direct cooling air against the tails E of the finished article A. By properly controlling the degree of heat, the tearing action is limited to portion F.

Finally, after the tearing is completed (FIGURE 13), further actuation of the cylinder 115 will ride the cam followers 132 down the surface 134 and the spring 128 will spread the lower parts of the arms 127, thus releasing the severed tail E from the gripping and tearing elements. The severed tail is free to fall intermediate the side plates 102 and the rapid arcuate motion of the arms 125 is sufficient to impart substantial ejection momentum to the tails E.

After the tails E have been removed from the articles A, the articles are maintained in position solely by their contact with the upper surface of the plate 40 and with the hold-down plate 91, or more specifically the resilient pad 92 carried by the plate 91. The finished articles A are now released for ejection from the forming machine by shutting off the flow of air under pressure into the diaphragm chamber 95 and venting the pressure to atmosphere, preferably by manipulation of a valve (not shown) located in the source line 100, so that the springs 93 can return the plate 91 to its elevated position at which the resilient pad 92 is out of contact with the finished portion B of the article A.

Next, an ejection cylinder 140 located laterally to one side of the take-out mechanism is actuated to advance an ejection plate 141 laterally over the plate 40 of the take-out device. Such actuation of the ejection plate 141 will move the articles A across the surface of the plate 40 so that they may fall therefrom by gravity into a removal trough 142 located beneath and laterally and to one side of the take-out mechanism. Preferably, the article-containing face of the plate 141 is provided with a resilient pad 143 similar to the pad 92 carried by the hold-down plate 91 so that the articles A will not be damaged by contact with the metallic plate 141 during such ejection. The ejection trough 142 communicates with the conveyor by which the articles A are carried to successive process stations for printing, filling, or other subsequent processing.

*Method and Operational Summary*

As hereinbefore explained, the operational characteristics of the device of the present invention arise because of the retention of the formed articles in the molding apparatus to a waste portion joined to fluid thermoplastic material filling an orifice. Additionally, the articles are positioned in longitudinal alignment and in a vertical, erect position by the retention of injection molded portions of the articles in the injection molds previously elevated during extrusion of the subsequently blown tubes.

As a consequence of these peculiar initial conditions, the present invention must operate in an environment generated by previous processing steps. Additionally, the operation of the apparatus during the article removal portion of the cycle is also at least partially dictated by the necessity of removing the tails or waste portions through which the articles are joined to the orifices prior to their removal.

Thus as set forth in the objects above, certain novel, manipulative steps are carried out. Briefly, these steps include the engagement of the still-hot article and waste portion combination only by the waste portion, so that the article will not be distorted by engaging the article surface. Next, the relative movement between the engaged waste portion and the orifice results in rupturing of the fluid material filling the orifice, so that the article and the integral waste portion are removed jointly from the forming machine, the forming machine thus being conditioned for its next operative or forming cycle. Movement of the article and the integral tail continues until the article is positioned wholly exteriorly of the forming apparatus, at which time the tail is aligned with the tail-removing elements. When the article is positioned to so align the tail, the tail is released by the means engaging the tail during its removal from the forming machine, and the article is engaged by hold-down elements for retaining the article in position during the subsequent tail-removing operation.

The tail-removing operation is carried out by gripping the tail and moving the tail arcuately relative to the article. Of course, the article is retained in fixed position by the hold-down means and the tail engaged adjacent one longitudinal extremity thereof is moved arcuately and downwardly away from the article to sever the tail at the juncture between the tail and the article. Following tearing of the tail from the article, the tail is released and falls by gravity from the article location.

Next, the articles are released from the hold-down mechanism, and an ejection apparatus is actuated to remove the article from the apparatus as a whole.

What I claim is:

1. In a method of removing articles retained in a molding apparatus by waste portions thereof and for removing the article waste portions, the steps of removing the articles from the apparatus while engaging only the waste portions thereof, releasing the article waste portions while supporting the articles, gripping the waste portions only adjacent one edge and tearing the waste portions from the articles by moving the gripped edges thereof arcuately.

2. A method of removing a plastic article from a molding apparatus wherein the article is restrained at one end by connection through a waste portion to fluid material in an orifice, comprising the steps of engaging only the article waste portion intermediate the article and the orifice, jointly moving the waste portion and the article from the orifice to rupture the fluid material in the orifice, supporting the article independently of the waste portion in spaced relation to the orifice, and tearing the waste portion from the supported article.

3. In an apparatus for removing a formed plastic article from a molding apparatus in which the article is restrained by a waste portion joined to fluid material in an orifice, the improvements of spaced gripping surfaces positioned on either side of the waste portion, means engaging the gripping surfaces with the waste portion, power means actuating said gripping surfaces for movement angularly with respect to said orifice to tear the waste portion from the fluid material, and means located exteriorly of said apparatus for releasing said gripping means.

4. In a method of removing articles retained in a molding apparatus by waste portions thereof and for removing the article waste portions, the steps of engaging the waste portions only, removing the articles from the apparatus while the waste portions thereof are so engaged, supporting the removed articles independently of the waste portions thereof, and tearing the waste portions from the supported articles by relatively arcuately moving the articles and the waste portions.

5. In an apparatus for removing a formed plastic article having an integral waste portion from molding apparatus including a mold, the improvement of means for removing the waste portion from the article, comprising means fixedly supporting the article independently of said mold apparatus and exterior to said mold, a pair of spaced engaging elements aligned laterally with and straddling the waste portion, pivot means supporting said elements for arcuate movement relative to the article, cam and follower means for effecting and maintaining engagement of the elements with the waste portion during such arcuate movement, and actuating means for moving said elements arcuately.

6. A take-out and waste portion removal device for use with a molding apparatus wherein a plurality of the articles are retained by waste portions joining the articles, respectively, with portions of the apparatus comprising reciprocal engaging means movable between a first position adjacent the aligned articles as retained in the apparatus and a second position exterior to the apparatus, power means for reciprocating said engaging means to and from said positions, means for actuating said engaging means into engagement with said waste portions at said first position, means for disengaging said engaging means from said waste portions at said second station, and waste portion removal means aligned with said waste portions and engageable therewith when said articles are at said second station.

7. In an apparatus for removing a formed plastic article having an integral waste portion from a molding apparatus in which the article was formed in a mold, the improvement of means for removing the waste portion from the article, comprising means for supporting the article at a position remote from the mold, a pair of pivoted levers each having a gripping surface adjacent one end thereof, said surfaces being spaced and aligned laterally with the waste portion, pivot means medially connecting said levers for scissors-like movement, cam means adjacent the other ends of said levers, follower means on the other ends of said levers, respectively, for traversing said cams to effect and maintain engagement of the gripping surfaces of said levers with the waste portion during traversing of said cam means, means supporting said levers and said pivot means for joint displacement relative to said cam means and to said article, and actuating means for said support means.

8. A combined take-out and tail-removal device for use with a molding apparatus wherein each of a plurality of formed articles is retained in the apparatus by a tail at one end thereof joined to a forming orifice, comprising reciprocal tail-engaging means movable between a first position adjacent the aligned articles as they are retained in the apparatus and a second position exterior to the apparatus, means for actuating said engaging means into engagement with said tails at said first position, power means for reciprocating said engaging means from said first position to said second position as the tails are engaged to tear the tails from the orifices, means for disengaging said engaging means from said waste portions at said second station, means supporting the articles at said second position independently of said tails and tail-removal means aligned with said tails and engageable therewith when said articles are at said second station.

9. A method of removing a plastic article from a molding apparatus wherein the article is restrained at one end by connection through a waste portion to fluid material in an orifice, comprising the steps of engaging only the article waste portion adjacent the orifice, moving the waste portion and the article from the orifice to rupture the material in the orifice, and continuing movement of the waste portion and the article to bodily remove the same from the molding apparatus.

10. In an apparatus for removing a formed plastic article from a molding apparatus in which the article is restrained by a waste portion joined to fluid material in an orifice, spaced gripping surfaces positioned on either side of the waste portion, power means actuating said gripping surfaces for movement angularly with respect to said orifice to tear the waste portion from the fluid material, and means located exteriorly of said apparatus for releasing said gripping means.

11. In a method of removing a waste portion from a plastic article integral therewith, the article having been previously formed in a separable mold and removed from the mold, the steps of fixedly supporting the article independently of the waste portion and of the mold, engaging the waste portion adjacent one extremity thereof, and moving the article and waste portion relatively arcuately to progressively separate the same.

12. In an apparatus for simultaneously removing a plurality of formed plastic articles from a molding apparatus in which the articles are restrained by individual waste portions individually joined to fluid material in separate orifices, spaced gripping jaws positioned on either side of the waste portions, means simultaneously engaging the jaws with said waste portions, power means actuating said jaws for movement relative to said orifices to tear the waste portions from the fluid material in the orifices and to move said jaws and the articles retained by the jaw-waste portions engagement from the molding apparatus, and means located exteriorly of said molding apparatus for releasing said jaws from the waste portions.

13. In an apparatus for removing a formed plastic article having an integral waste portion from molding apparatus including a mold, the improvement of means for removing the waste portion from the article, comprising a pair of spaced engaging elements between which the waste portion is positioned following complete removal of the article from the mold, pivot means supporting said elements for joint arcuate movement, means responsive to arcuate movement of the elements to clamp the waste portion between the elements during such arcuate movement, and actuating means for moving said elements arcuately to tear the waste portion from the article.

14. A take-out device for removing a plurality of aligned plastic articles from molding apparatus, each of the articles being retained in the apparatus by a waste portion at one end thereof joined to fluid material filling an adjacent orifice, respectively, comprising a reciprocal take-out element movable between a first position adjacent the aligned articles retained in the apparatus and a second position exterior to the apparatus, power means for reciprocating said take-out element to and from said positions, engaging means carried by said element to be interposed between said articles and said orifices, respectively, means for actuating said engaging means into engagement with said waste portions when said element is at said first position, movement of the element to its second position tearing the waste portions from the orifices, and means for disengaging said engaging means from said waste portions when said element is at said second station.

15. In a method of removing simultaneously a plurality of aligned articles retained in a molding apparatus by waste portions thereof joined to forming orifices, respectively, and for simultaneously removing the article waste portions from all of said articles, the steps of engaging the waste portions of all of said articles, removing the articles from the apparatus by movement in the plane of alignment of the articles while engaging only the waste portions thereof, aligning the waste portions of said articles with gripping elements, respectively, releasing the article waste portions while supporting the articles, retaining said articles with the waste portions so aligned, gripping the waste portions by said gripping elements adjacent one edge thereof, and simultaneously moving all of said gripping elements arcuately to tear the waste portions from the retained articles.

16. A method of removing a plastic article from a molding apparatus wherein the article is restrained at one end by connection through an integral waste portion to fluid material in an orifice and of separating the waste portion from the article, comprising the steps of engaging only the article waste portion adjacent the orifice, moving the waste portion and the article from the orifice to rupture the material in the orifice, continuing the movement of the waste portion, and arcuately moving the waste portion relative to the article to separate the waste portion therefrom.

17. In a method of removing a plurality of aligned plastic articles from a molding apparatus in which each of the articles is retained by a waste portion at one end thereof joined to fluid material filling an adjacent orifice, respectively, the steps of engaging the waste portions intermediate said articles and said orifices, respectively, moving the engaged waste portions and the articles integral therewith from the orifices, and releasing said waste portions only when the articles are positioned exteriorly of the molding apparatus.

References Cited in the file of this patent

UNITED STATES PATENTS

| | | |
|---|---|---|
| 2,890,483 | Soubier | June 16, 1959 |
| 2,908,034 | Hackett | Oct. 13, 1959 |
| 2,928,120 | Leghorn et al. | Mar. 15, 1960 |
| 2,936,481 | Wilkalis et al. | May 17, 1960 |

FOREIGN PATENTS

| | | |
|---|---|---|
| 203,875 | Australia | Oct. 25, 1956 |